(12) United States Patent
Cho

(10) Patent No.: US 7,486,427 B2
(45) Date of Patent: Feb. 3, 2009

(54) POLYGON MIRROR, LASER SCANNING UNIT HAVING THE SAME, AND IMAGE FORMING APPARATUS HAVING THE SAME

(75) Inventor: Hee-sung Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/646,377

(22) Filed: Dec. 28, 2006

(65) Prior Publication Data

US 2008/0018973 A1    Jan. 24, 2008

(30) Foreign Application Priority Data

Jul. 18, 2006    (KR) ...................... 10-2006-0067009

(51) Int. Cl.
*G02B 26/08* (2006.01)
(52) U.S. Cl. ....................... 359/216; 359/883
(58) Field of Classification Search ............... 359/216, 359/883
See application file for complete search history.

(56) References Cited

U.S. PATENT DOCUMENTS

| 4,643,518 | A | * | 2/1987 | Taniguchi | 359/218 |
|---|---|---|---|---|---|
| 5,946,125 | A | * | 8/1999 | Ang | 359/216 |
| 5,953,147 | A | * | 9/1999 | Brandt et al. | 359/212 |
| 2001/0024323 | A1 | | 9/2001 | Yanagi et al. | |
| 2002/0041419 | A1 | | 4/2002 | Takada et al. | |

OTHER PUBLICATIONS

European Patent Office Search Report No. 07107258.1, Sep. 7, 2007.

* cited by examiner

*Primary Examiner*—Euncha P Cherry
(74) *Attorney, Agent, or Firm*—Stein, McEwen & Bui, LLP

(57) ABSTRACT

A polygon mirror of a laser scanning unit includes reflective surfaces to reflect laser beams, and first to third dielectric layers laminated on the reflective surfaces. The second dielectric layer comprises $TiO_2$, which can reduce a reflectivity deviation of the wavelengths of the laser beams to below 2%.

8 Claims, 4 Drawing Sheets

POLYGON MIRROR, LASER SCANNING UNIT HAVING THE SAME, AND IMAGE FORMING APPARATUS HAVING THE SAME

CROSS-REFERENCE TO RELATED APPLICATIONS

This application claims benefit under 35 U.S.C. § 119 from Korean Patent Application No. 2006-67009, filed Jul. 18, 2006 in the Korean Intellectual Property Office, the disclosure of which is incorporated herein by reference.

BACKGROUND OF THE INVENTION

1. Field of the Invention

Aspects of the present invention relate to a laser scanning unit for deflectively scanning incident light, and more particularly, to an improved polygon mirror of a laser scanning unit and an image forming apparatus having the same.

2. Description of the Related Art

In general, a laser scanning unit is employed with a printing apparatus, such as a laser printer, a copier and a fax machine, using electrophotography. The laser scanning unit includes a light source for irradiating laser beams, a polygon mirror for reflecting and scanning the irradiated beams to a predetermined direction, an Fθ lens for converting the reflected beams into parallel beams, and a reflecting mirror for reflecting the beams passing through the Fθ lens to a predetermined destination.

The polygon mirror includes a plurality of reflective surfaces which can reflect incident light. The polygon mirror is rotated at a high speed to reflect the incident light to a predetermined direction.

According to U.S. Pat. No. 5,946,125, a first dielectric layer made of $SiO_2$, a second dielectric layer made of ZnSe (Zinc Selenide), and a third dielectric layer made of $SiO_2$ are sequentially coated on the reflective surfaces of the polygon mirror. In this structure, the aluminum reflective surfaces can be protected. Even if an incident angle of laser beams incident on the reflective surfaces varies from 10° to 50°, S and P polarizations maintain a constant reflectivity due to an interference effect caused by the thickness of the dielectrics.

In the conventional multi-coating type polygon mirror, when the incident angle ranges from 10° to 50°, the S and P polarizations maintain an approximately constant reflectivity. However, about 5% of reflectivity deviation is generated according to wavelengths of the laser beams. This reflectivity deviation restricts the use of the polygon mirror.

Additionally, the conventional multi-coating type polygon mirror maintains approximately constant reflectivity until the wavelength of the laser beam decreases to about 500 nm, but the reflectivity deviation then increases in the 400 nm to 450 nm band. Therefore, the polygon mirror does not function efficiently with a blue laser diode.

Furthermore, ZnSe, which is the material of the second dielectric layer, is expensive and poisonous. It is therefore difficult to handle ZnSe and achieve mass production of the conventional polygon mirror.

SUMMARY OF THE INVENTION

Aspects of the present invention provide a polygon mirror which can maintain a constant reflectivity in various wavelength bands and which can be produced cheaply and in a stable fashion, a laser scanning unit having the same, and an image forming apparatus having the same.

Additional aspects and/or advantages of the invention will be set forth in part in the description which follows and, in part, will be obvious from the description, or may be learned by practice of the invention.

According to an aspect of the present invention, a polygon mirror of a laser scanning unit includes reflective surfaces to reflect laser beams, and first, second and third dielectric layers laminated on the reflective surfaces. According to an aspect of the present invention, the second dielectric layer is made of $TiO_2$.

According to a first embodiment of the present invention, the first dielectric layer and the third dielectric layers comprise the same material.

The first dielectric layer and the third dielectric layer may both comprise $SiO_2$. Preferably, when the wavelength of the beams incident on the reflective surfaces is λ, the first dielectric layer has a thickness of 0.19λ, the second dielectric layer has a thickness of 0.36λ, and the third dielectric layer has a thickness of 0.25λ.

According to a second embodiment of the present invention, the first dielectric layer and the third dielectric layer comprise different materials.

The first dielectric layer is made of $SiO_2$ and the third dielectric layer is made of $Al_2O_3$. Preferably, when the wavelength of the incident beams is λ, the first dielectric layer has a thickness of 0.16λ, the second dielectric layer has a thickness of 0.32λ, and the third dielectric layer has a thickness of 0.26λ.

In the first and second embodiments of the present invention, each of the first, second and third dielectric layers has a thickness error of ±20%.

Preferably, the reflective surfaces comprise aluminum.

According to an aspect of the present invention, a laser scanning unit may, although not necessarily, include a light source to generate predetermined beams, a polygon mirror having a plurality of reflective surfaces to reflect the beams emitted from the light source to a scanning object, the polygon mirror being rotated to perform deflective scanning by the reflective surfaces, and first, second and third dielectric layers laminated on the reflective surfaces. According to an aspect of the present invention, the second dielectric layer used in the polygon mirror of the laser scanning unit is made of $TiO_2$.

According to an aspect of the present invention, an image forming apparatus may, although not necessarily, include a photosensitive medium and a laser scanning unit, wherein the laser scanning unit includes a light source to generate predetermined beams, a polygon mirror having a plurality of reflective surfaces to reflect the beams emitted from the light source to a scanning object, the polygon mirror being rotated to perform deflective scanning by the reflective surfaces, and first, second and third dielectric layers laminated on the reflective surfaces. According to an aspect of the present invention, the second dielectric layer used in the polygon mirror of the image forming apparatus is made of $TiO_2$.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
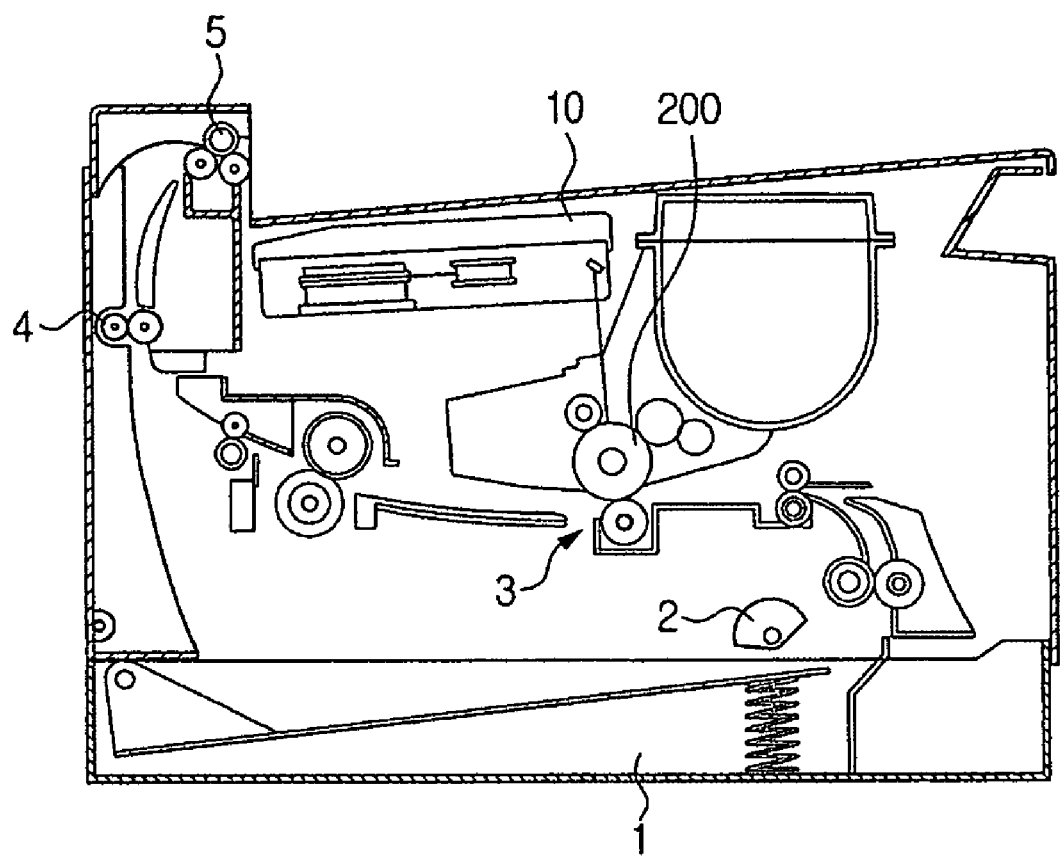
FIG. 1 is a schematic diagram illustrating an image forming apparatus according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
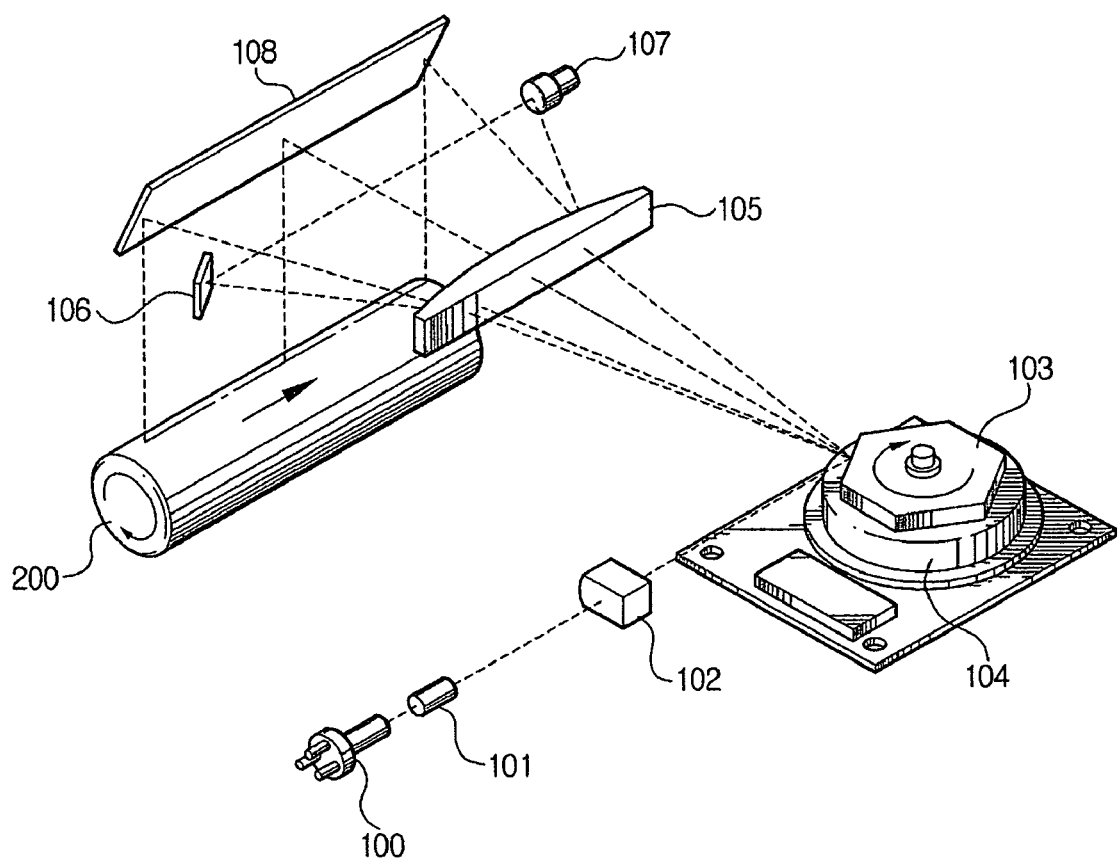
FIG. 2 is a schematic diagram illustrating the laser scanning unit shown in FIG. 1.

FIG. 1 is a schematic diagram illustrating an image forming apparatus according to an embodiment of the present invention. FIG. 2 is a schematic diagram illustrating the laser scanning unit shown in FIG. 1.

Referring to FIG. 1, the image forming apparatus includes a paper feeding unit 1, a transferring unit 2, a printing engine 3 having a photosensitive medium 200, a settling unit 4, a paper discharging unit 5, and a laser scanning unit 10 for forming an electrostatic latent image on the photosensitive medium 200. It is understood that the image forming apparatus may include other components instead of or in addition to the components shown in FIG. 1.

The laser scanning unit 10 includes a laser diode 100 used as a light source to emit laser beams, a collimator lens 101 to convert the laser beams emitted from the laser diode 100 into parallel beams or convergent beams to an optical axis, a cylinder lens 102 to converge the parallel beams to a sub scanning direction, a polygon mirror 103 to transfer and scan the laser beams passing through the collimator lens 101 and the cylinder lens 102 in the horizontal direction at a regular flux, and a polygon mirror driving motor 104 to rotate the polygon mirror 103 at a regular speed. The laser scanning unit 10 further includes an Fθ lens 105 having a predetermined refraction rate to the optical axis, and which adjusts a focus on the scanning surface by polarizing the regular speed laser beams reflected by the polygon mirror 103 to a main scanning direction and which also corrects aberration, an image forming reflecting mirror 108 to form an electrostatic latent image on the surface of the photosensitive medium 200 which is an image forming surface, by reflecting the laser beams passing through the Fθ lens 105 to a predetermined direction, a first sensor 107 to receive the laser beams and to adjust horizontal synchronization, and a synchronous signal detecting reflecting mirror 106 to reflect the laser beams to a synchronization detecting optical sensor. Generally, the aforementioned components are assembled on one frame to form the laser scanning unit 10. It is understood, however, that the aforementioned components may be assembled in various configurations and are not required to be assembled onto one frame to form the laser scanning unit 10.

Figure 3:
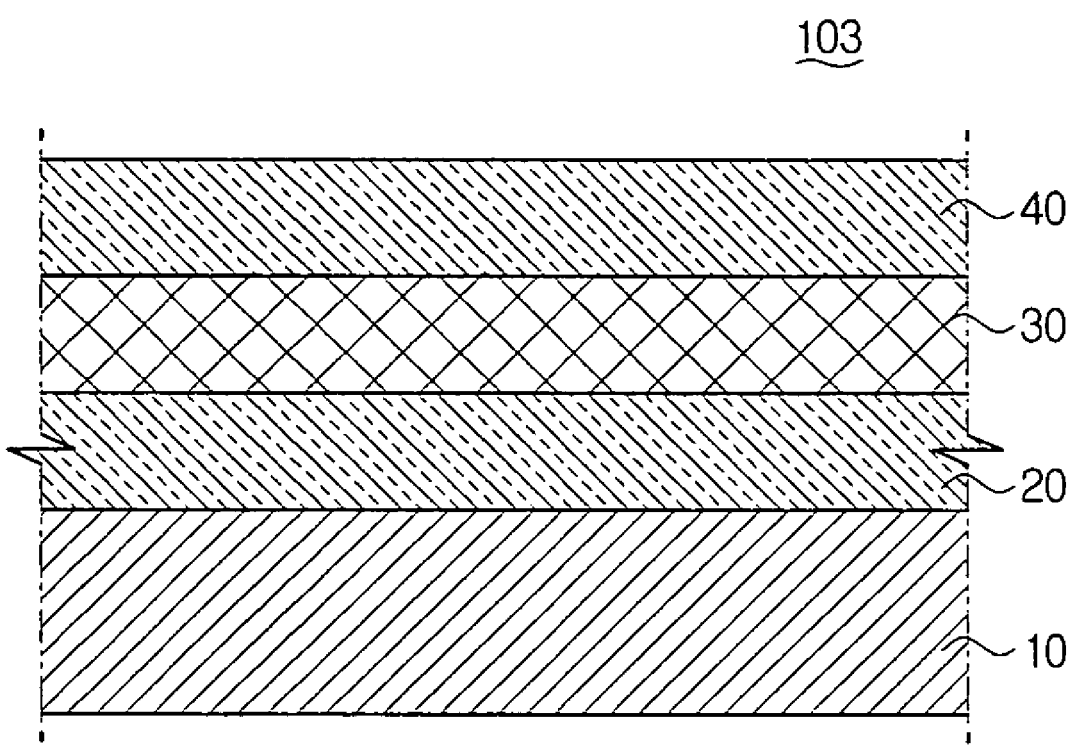
FIG. 3 is an enlarged diagram illustrating a dielectric layer structure of the polygon mirror shown in FIG. 2.

FIG. 3 is an enlarged diagram illustrating the multilayered structure polygon mirror 103 of FIG. 2. As shown in FIG. 3, in the polygon mirror 103 comprising aluminum, a first dielectric layer 20, a second dielectric layer 30 and a third dielectric layer 40 are sequentially laminated and coated on the reflective surfaces 10 to receive the laser beams.

In accordance with a first embodiment of the present invention, the first dielectric layer 20 and the third dielectric layer 40 comprise the same material. In this first embodiment, the first dielectric layer 20 and the third dielectric layer 40 preferably, although not necessarily, comprise $SiO_2$, and the second dielectric layer 30 comprises $TiO_2$. It is understood that the present invention is not limited to having dielectric layers, and may instead use other types of layers.

When it is presumed that the wavelength of the laser diode beams incident on the reflective surfaces 10 is λ, the following table shows the thicknesses of the first, second and third dielectric layers 20, 30 and 40, respectively, as shown in FIG. 3.

TABLE 1

| First dielectric layer | Material | $SiO_2$ |
| | Thickness | 0.19λ |
| Second dielectric layer | Material | $TiO_2$ |
| | Thickness | 0.36λ |
| Third dielectric layer | Material | $SiO_2$ |
| | Thickness | 0.25λ |

Figure 4:
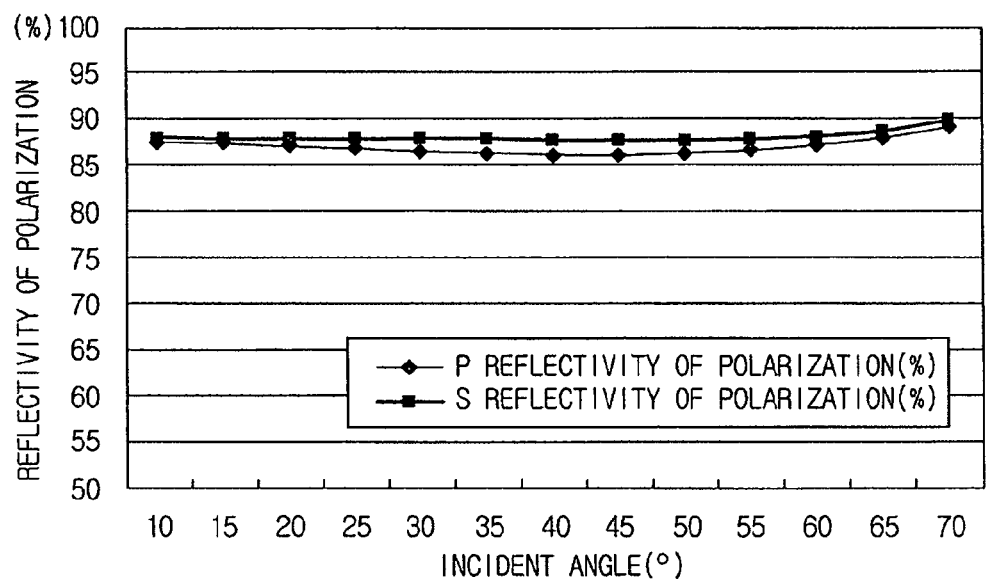
FIG. 4 is a graph showing variation rates of S and P polarizations of a polygon mirror according to a first embodiment of the present invention.

FIG. 4 is a graph showing experimental results of reflectivities (%) of S and P polarizations of the polygon mirror using the laser beams (λ=780 nm) in accordance with the first embodiment of the present invention.

Table 2 shows the variations of the experiment values as a function of incident angles.

TABLE 2

| Incident angle (degree) | Reflectivity of P polarization (%) | Reflectivity of S polarization (%) |
| --- | --- | --- |
| 10 | 87.8 | 88.0 |
| 15 | 87.5 | 88.0 |
| 20 | 87.3 | 88.0 |
| 25 | 86.9 | 88.0 |
| 30 | 86.6 | 88.0 |
| 35 | 86.4 | 88.0 |
| 40 | 86.2 | 87.8 |
| 45 | 86.2 | 87.8 |
| 50 | 86.4 | 87.8 |
| 55 | 86.8 | 87.9 |
| 60 | 87.3 | 88.2 |
| 65 | 88.2 | 88.8 |
| 70 | 89.3 | 89.9 |

As shown in FIG. 4 and Table 2, when the incident angle is changed from 10° to 70°, the reflectivity of the P polarization has a minimum of 86.2% and a maximum of 89.3%, resulting in a deviation of about 3%, and the reflectivity of the S polarization has a minimum of 87.8% and a maximum of 89.9%, resulting in a deviation of about 2%.

When it is considered that the most frequently used incident angle band of the laser beams ranges from 10° to 50°, the reflectivity of the P polarization has a minimum of 86.2% and a maximum of 87.8%, resulting in a deviation of 1.6%, and the reflectivity of the S polarization has a minimum of 87.8% and a maximum of 88.0%, resulting in a deviation of 0.2%. In accordance with the first embodiment of the present invention, the polygon mirror has a more stable reflectivity, costs less to manufacture, and is safer to produce than a conventional polygon mirror.

In accordance with a second embodiment of the present invention, the first dielectric layer 20 and the third dielectric layer 40 comprise different materials. In this second embodiment, the first dielectric layer 20 preferably, but not necessarily, comprises $SiO_2$, the third dielectric layer 40 preferably, but not necessarily, comprises $Al_2O_3$, and the second dielectric layer 30 comprises $TiO_2$.

When it is presumed that the wavelength of the laser diode beams incident on the reflective surfaces 10 is λ, the following table shows the thicknesses of the first, second and third dielectric layers 20, 30 and 40, respectively, as shown in FIG. 3.

TABLE 3

| First dielectric layer | Material | $SiO_2$ |
|---|---|---|
|  | Thickness | $0.16\lambda$ |
| Second dielectric layer | Material | $TiO_2$ |
|  | Thickness | $0.32\lambda$ |
| Third dielectric layer | Material | $Al_2O_3$ |
|  | Thickness | $0.26\lambda$ |

Figure 5:
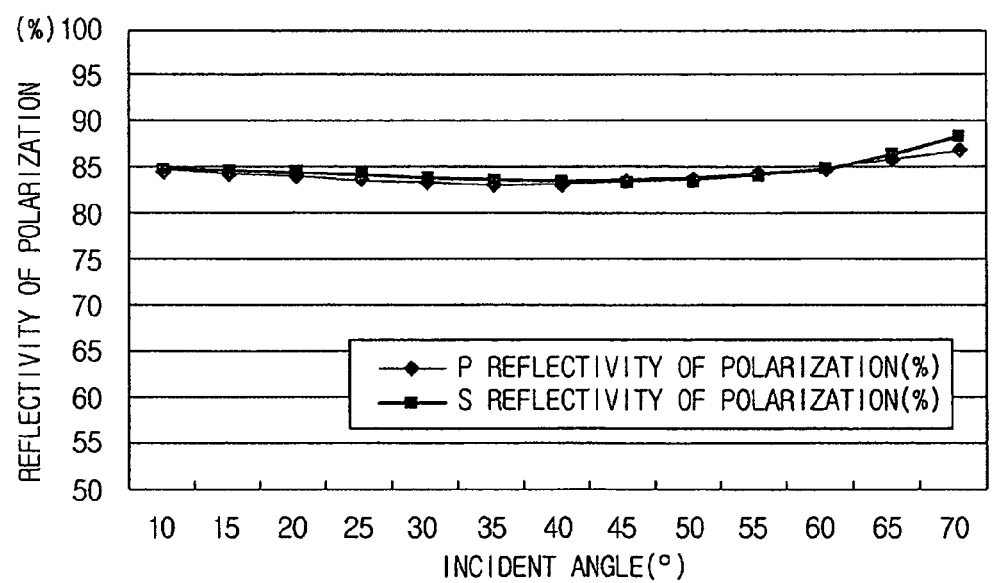
FIG. 5 is a graph showing variation rates of S and P polarizations of a polygon mirror according to a second embodiment of the present invention.

FIG. 5 is a graph showing experimental results of reflectivities (%) of S and P polarizations of the polygon mirror using the laser beams ($\lambda$=780 nm) in accordance with the second embodiment of the present invention.

Table 4 shows the variations of the experimental values as a function of incident angles.

TABLE 4

| Incident angle (degree) | Reflectivity of P polarization (%) | Reflectivity of S polarization (%) |
|---|---|---|
| 10 | 84.7 | 84.8 |
| 15 | 84.4 | 84.7 |
| 20 | 84.1 | 84.5 |
| 25 | 83.8 | 84.3 |
| 30 | 83.5 | 84.0 |
| 35 | 83.3 | 83.7 |
| 40 | 83.3 | 83.5 |
| 45 | 83.5 | 83.4 |
| 50 | 83.8 | 83.6 |
| 55 | 84.3 | 84.0 |
| 60 | 84.9 | 85.0 |
| 65 | 85.8 | 86.4 |
| 70 | 87.1 | 88.4 |

As shown in FIG. 5 and Table 4, when the incident angle is changed from 10° to 70°, the reflectivity of the P polarization has a minimum of 83.3% and a maximum of 87.1%, resulting in a deviation below 4%, and the reflectivity of the S polarization has a minimum of 83.4%% and a maximum of 88.4%, resulting in a deviation of 5%.

When it is considered that the most frequently used incident angle band of the laser beams ranges from 10° to 50°, the reflectivity of the P polarization has a minimum of 83.3% and a maximum of 84.7%, resulting in a deviation of 1.4%, and the reflectivity of the S polarization has a minimum of 83.4% and a maximum of 84.8%, resulting in a deviation of 1.4%. In accordance with the second embodiment of the present invention, the polygon mirror has a more stable reflectivity, costs less to manufacture, and is safer to produce than a conventional polygon mirror.

In the first and second embodiments of the present invention, each of the first to third dielectric layers 20, 30 and 40, respectively, as shown in FIG. 3, has a thickness error of ±20%.

Preferably, the reflective surfaces 10 comprise aluminum, which is not intended to be limiting. In other words, the reflective surfaces 10 may comprise materials other than aluminum, such as a polymer compound having an excellent reflecting property.

The polygon mirror according to aspects of the present invention functions efficiently with various wavelengths of laser beams, as compared to the conventional polygon mirror.

Table 5 shows variations of reflectivities of P polarization and S polarization as a function of incident angles, when laser beams having different wavelengths are applied to the polygon mirror in accordance with the first embodiment of the present invention.

TABLE 5

|  | 800 nm | | 750 nm | | 700 nm | | 650 nm | | 600 nm | |
|---|---|---|---|---|---|---|---|---|---|---|
| Incident angle (degree) | R of P (%) | R of S (%) | R of P (%) | R of S (%) | R of P (%) | R of S (%) | R of P (%) | R of S (%) | R of P (%) | R of S (%) |
| 10 | 87.31 | 87.53 | 88.48 | 88.67 | 89.54 | 89.72 | 91.34 | 91.49 | 91.97 | 92.11 |
| 20 | 86.77 | 87.54 | 87.98 | 88.68 | 89.09 | 89.73 | 90.96 | 91.50 | 91.62 | 92.13 |
| 30 | 86.11 | 87.50 | 87.38 | 88.64 | 88.54 | 89.69 | 90.50 | 91.47 | 91.18 | 92.12 |
| 40 | 85.69 | 87.38 | 87.00 | 88.53 | 88.19 | 89.58 | 90.21 | 91.38 | 90.91 | 92.05 |
| 50 | 85.87 | 87.31 | 87.17 | 88.44 | 88.35 | 89.49 | 90.34 | 91.30 | 91.03 | 91.98 |
| 60 | 86.83 | 87.73 | 88.05 | 88.81 | 89.17 | 89.79 | 91.04 | 91.54 | 91.70 | 92.16 |
| 70 | 88.93 | 89.52 | 89.97 | 90.43 | 90.94 | 91.24 | 92.52 | 92.72 | 93.12 | 93.20 |

| Incident angle (degree) | 550 nm | | 500 nm | | 450 nm | | 400 nm | |
|---|---|---|---|---|---|---|---|---|
|  | R of P (%) | R of S (%) | R of P (%) | R of S (%) | R of P (%) | R of S (%) | R of P (%) | R of S (%) |
| 10 | 92.45 | 92.59 | 93.00 | 93.13 | 93.52 | 93.64 | 93.59 | 93.71 |
| 20 | 92.12 | 92.62 | 92.69 | 93.16 | 93.24 | 93.68 | 93.33 | 93.75 |
| 30 | 91.71 | 92.61 | 92.31 | 93.16 | 92.89 | 93.70 | 93.00 | 93.77 |
| 40 | 91.45 | 92.55 | 92.07 | 93.10 | 92.66 | 93.65 | 92.79 | 93.71 |
| 50 | 91.57 | 92.46 | 92.18 | 93.00 | 92.77 | 93.54 | 92.93 | 93.54 |
| 60 | 92.22 | 92.59 | 92.81 | 93.06 | 93.38 | 93.53 | 93.56 | 93.40 |
| 70 | 93.60 | 93.48 | 94.13 | 93.79 | 94.65 | 94.08 | 94.85 | 93.74 |

(R = reflectivity, P = P polarization, S = S polarization)

As shown in the above table, even when the wavelengths of the laser beams are varied from 400 nm to 800 nm, the reflectivities of the P polarization and the S polarization only vary slightly at each incident angle. In other words, the polygon mirror according to aspects of the present invention maintains an approximately constant reflectivity in regard to laser beams having various wavelengths. Thus, as shown in Table 5, a first embodiment of the present invention reduces the reflectivity deviation of the conventional polygon mirror (about 5%) caused by the wavelengths of the laser beams to below 2%.

When an image forming apparatus uses a conventional polygon mirror, constant reflectivity is maintained in the laser beams in the 800 nm to 500 nm band, but the reflectivity deviation exceeds 20% in the 400 nm to 450 nm band. However, since aspects of the present invention reduce reflectivity deviation below 2%, even a laser scanning unit using a blue laser diode can reflect the laser beams at a regular concentration, thereby improving the quality of an image formed by an image forming apparatus.

Furthermore, aspects of the present invention use $TiO_2$, which is much cheaper than ZnSe, to coat the reflective surfaces of the polygon mirror, reducing the production cost of the polygon mirror, which is a significant advantage for mass production of the polygon mirrors. Additionally, unlike poisonous ZnSe, $TiO_2$ is not poisonous, and thus will not injure an operator of the image forming apparatus during operation. As a result, the polygon mirror according to aspects of the present invention can be cheaply and safely mass-produced.

In accordance with aspects of the present invention, the polygon mirror can maintain a uniform reflectivity deviation for light sources having various wavelengths, and the polygon mirror may therefore be applied to a light source whose polarization state is varied in real time, such as a Vertical-Cavity Surface-Emitting Laser (VCSEL). As a result, aspects of the present invention provide a polygon mirror capable of scanning high quality images without a concentration difference.

Although a few embodiments of the present invention have been shown and described, it would be appreciated by those skilled in the art that changes may be made in this embodiment without departing from the principles and spirit of the invention, the scope of which is defined in the appended claims and their equivalents.

What is claimed is:

1. A polygon mirror, comprising:
   reflective surfaces to reflect laser beams; and
   first, second and third dielectric layers sequentially laminated on the reflective surfaces,
   wherein the second dielectric layer is made of $TiO_2$ and is formed to a thickness of $0.32\lambda$ to $0.36\lambda$, where $\lambda$ is a wavelength of the reflected laser beam.

2. The polygon mirror as claimed in claim 1, wherein the first dielectric layer and the third dielectric layer are made of $SiO_2$.

3. The polygon mirror as claimed in claim 2, wherein, when the laser beams incident on the reflective surfaces have a wavelength of $\lambda$, the first dielectric layer has a thickness of $0.19\lambda$, the second dielectric layer has a thickness of $0.36\lambda$, and the third dielectric layer has a thickness of $0.25\lambda$.

4. The polygon mirror as claimed in claim 1, wherein the first dielectric layer comprises $SiO_2$ and the third dielectric layer are made of $Al_2O_3$.

5. The polygon mirror as claimed in claim 4, wherein, when the laser beams incident on the reflective surfaces have a wavelength of $\lambda$, the first dielectric layer has a thickness of $0.16\lambda$, the second dielectric layer has a thickness of $0.32\lambda$, and the third dielectric layer has a thickness of $0.26\lambda$.

6. A laser scanning unit, comprising:
   a light source to generate predetermined beams; and
   the polygon mirror as recited in claim 1, to reflect the predetermined beams emitted from the light source to a scanning object.

7. The laser scanning unit of claim 6, wherein the light source comprises a Vertical-Cavity Surface-Emitting Laser (VCSEL).

8. An image forming apparatus, comprising:
   a photosensitive medium; and
   a laser scanning unit to form an electrostatic latent image on the photosensitive medium,
   wherein the laser scanning unit comprises:
      a light source to generate predetermined beams, and
      the polygon mirror as recited in claim 1, to reflect the predetermined beams emitted from the light source to a scanning object.

* * * * *